(12) United States Patent
Wenderoth et al.

(10) Patent No.: US 7,588,695 B2
(45) Date of Patent: Sep. 15, 2009

(54) ANTIFREEZE CONCENTRATES AND COOLANT COMPOSITIONS BASED ON POLYGLYCOLS AND AMIDES FOR PROTECTING MAGNESIUM AND THE ALLOYS THEREOF

(75) Inventors: Bernd Wenderoth, Birkenau (DE); Stefan Dambach, Haβloch (DE); Gerhard Weiβ, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 192 days.

(21) Appl. No.: 10/550,740

(22) PCT Filed: Mar. 24, 2004

(86) PCT No.: PCT/EP2004/003108

§ 371 (c)(1),
(2), (4) Date: Aug. 24, 2006

(87) PCT Pub. No.: WO2004/085566

PCT Pub. Date: Oct. 7, 2004

(65) Prior Publication Data

US 2007/0034825 A1   Feb. 15, 2007

(30) Foreign Application Priority Data

Mar. 25, 2003  (DE) ............................... 103 13 280

(51) Int. Cl.
*C09K 5/00* (2006.01)

(52) U.S. Cl. ..................... 252/73; 252/71; 252/74; 252/75; 252/77

(58) Field of Classification Search .............. 252/71, 252/73, 74, 75, 77
See application file for complete search history.

(56) References Cited

U.S. PATENT DOCUMENTS

| | | | |
|---|---|---|---|
| 2,976,247 A | | 3/1961 | Truitt |
| 3,362,910 A | | 1/1968 | Ordelt et al. |
| 4,452,758 A | * | 6/1984 | Wilson et al. ............. 422/15 |
| 4,455,248 A | * | 6/1984 | Wood ....................... 252/75 |
| 4,561,990 A | * | 12/1985 | Darden ..................... 252/75 |
| 4,563,294 A | * | 1/1986 | Geymayer et al. ......... 508/404 |
| 4,758,367 A | * | 7/1988 | George ...................... 252/75 |
| 5,055,230 A | * | 10/1991 | Clubley et al. .......... 252/389.62 |
| 5,240,631 A | * | 8/1993 | Mascioli et al. ............. 252/75 |
| 5,997,763 A | * | 12/1999 | Pabon et al. ................ 252/79 |
| 6,093,341 A | * | 7/2000 | Minks et al. ................ 252/70 |
| 6,391,257 B1 | * | 5/2002 | Woyciesjes ................. 422/17 |
| 6,540,934 B2 | * | 4/2003 | Sapienza et al. ........... 252/70 |
| 6,802,988 B1 | * | 10/2004 | Wenderoth et al. ......... 252/73 |
| 2003/0164470 A1 | * | 9/2003 | Wenderoth et al. ......... 252/71 |
| 2006/0163528 A1 | * | 7/2006 | Wenderoth et al. ......... 252/73 |
| 2008/0149883 A1 | * | 6/2008 | Kormann et al. ........... 252/75 |

FOREIGN PATENT DOCUMENTS

| | | |
|---|---|---|
| DE | 569 771 | 2/1933 |
| DE | 579 185 | 6/1933 |
| DE | 37 01 719 | 8/1988 |
| DE | 196 05 509 | 8/1997 |
| EP | 0 048 429 | 3/1982 |
| EP | 0 229 440 | 7/1987 |
| EP | 0 251 480 | 1/1998 |
| EP | 1 386 952 | 2/2004 |
| JP | 04279690 A * | 10/1992 |
| SU | 1838362 A3 * | 1/1992 |
| WO | WO 89/09806 * | 10/1989 |
| WO | 95/07323 | 3/1995 |
| WO | 99/19418 | 4/1998 |
| WO | 00/22189 | 4/2000 |
| WO | 02/08354 | 1/2002 |

OTHER PUBLICATIONS

Derwent Abstract of SU 1838362 A3, Jan. 1992, Ashikhmin et al.*
USPTO Human Translation of SU 1838362 A3.*
Derwent abstract of JP 04279690 A, Kanai et al.*
STIC English translation of SU 1838362 A3 Ashikhmin et al.*

* cited by examiner

*Primary Examiner*—Mark Eashoo
*Assistant Examiner*—Jane L Stanley
(74) *Attorney, Agent, or Firm*—Oblon, Spivak, McClelland, Maier & Neustadt, P.C.

(57) ABSTRACT

Ready-to-use aqueous coolant compositions having alkylene glycols, glycerol and/or 1,3-propanediol and a) from 0.05 to 10% by weight, based on the total amount of the composition, of one or more polyethylene glycols and/or polypropylene glycols and b) from 0.01 to 10% by weight, based on the total amount of the composition, of one more carboxamides and/or sulfonamides are useful for inhibiting corrosion in the case of magnesium and magnesium alloys.

11 Claims, No Drawings

ANTIFREEZE CONCENTRATES AND COOLANT COMPOSITIONS BASED ON POLYGLYCOLS AND AMIDES FOR PROTECTING MAGNESIUM AND THE ALLOYS THEREOF

CROSS REFERENCE TO RELATED APPLICATION

This application is a 371 of PCT/EP04/0043108, filed Mar. 24, 2004, and claims priority to German Application No. 103 13 280.5, filed Mar. 25, 2003.

The present invention relates to antifreeze concentrates based on polyglycols and carboxamides and/or sulfonamides and ready-to-use aqueous coolant compositions obtainable from the concentrates. The present invention also relates to the use of these antifreeze concentrates for the preparation of aqueous coolant compositions which are suitable in particular for magnesium- and/or aluminum-containing internal combustion engines.

Antifreeze concentrates for the cooling circulations of internal combustion engines, for example in automobiles, generally contain alkylene glycols, especially ethylene glycol or propylene glycol, as the main component. For use in the cooling system, they are diluted with water and, in addition to protection from freezing, should also ensure good heat removal. Alkylene glycol/water mixtures are, however, very corrosive at the operating temperatures of internal combustion engines. The various metals and alloys thereof which occur in the cooling system must therefore be adequately protected from the various types of corrosion, for example pitting, crevice corrosion, erosion or cavitation.

According to the prior art, a large number of chemical substances is used as corrosion inhibitors in such cooling systems for the variety of different metals, such as steel, cast iron, copper, brass, aluminum and alloys thereof, and solder metals, for example tin solder. When they are used for cooling the engines predominantly used today by the automotive industry and comprising gray cast iron or cast aluminum alloys, the radiator antifreezes obtained fill the expectations with regard to corrosion prevention.

In automotive construction, attempts are currently being made to reduce fuel consumption by reducing the weight of motor vehicles. For example, attempts are being made to reduce the weight of engines by constructing them partly or completely from magnesium or magnesium alloys.

However, experiments have shown that, as a result of the high chemical activity of the magnesium, the radiator antifreezes on the market today offer only very limited corrosion prevention for this metal and alloys thereof.

There are to date only a few patent publications which offer solutions to these problems.

As early as 1931, DRP 569 771 (1) described a cooling fluid for internal combustion engine parts consisting of magnesium alloys, which cooling fluid comprised a polyhydric alcohol containing small amounts of an alkali metal fluoride, in the presence or absence of water.

In the same year, DRP 579 185 (2) described the use of alkali metal sulfides for the same purpose.

However, the use of fluorides or sulfides is no longer desirable today because these classes of substances are toxicologically unacceptable.

WO 95/07323 (3) describes anhydrous radiator antifreezes based on monopropylene glycol, containing molybdate, nitrate and an azole derivative, such as tolutriazole, for corrosion prevention of various metals, including magnesium and magnesium alloys. However, anhydrous radiator antifreezes are not relevant in practice owing to their poor thermal conductivity.

EP 229 440 B1 (4) describes coolant concentrates which are also said to have corrosion prevention properties for magnesium, comprising aliphatic monocarboxylic acid salts, aliphatic dicarboxylic acid salts and a hydrocarbon-triazole and, if required, additionally an alkali metal borate, silicate, benzoate, nitrate, nitrite or molybdate and/or a hydrocarbon-carbazole. Specific corrosion test results are not described for magnesium.

EP 251 480 B1 (5) describes coolant concentrates comprising alkylbenzoic acid salts, aliphatic monocarboxylic acid salts and a triazole and, if required, further components which are said to lead to improved corrosion prevention not only in the case of the metals customarily used to date in engine construction but also in the case of magnesium. Specific corrosion test results are not mentioned here for magnesium.

As an improvement compared with (5), WO 00/22189 (6) describes cooling fluids which contain a combination of carboxylic acid salts with fluoride and/or fluorocarboxylic acid salts. A disadvantage here, however, is in particular the use of the toxicologically unacceptable hydrofluoric acid.

WO 99/19418 (7) describes a cooling fluid based on polyhydric alcohols for magnesium components, consisting of a combination of branched aliphatic carboxylic acid salts and alkanolamine phosphates and tolutriazole/benzotriazole, to which, if required, further additives, such as aliphatic or aromatic mono- and/or dicarboxylic acid salts, mercaptobenzothiazole or carboxymethylcellulose, can be added. However, the corrosion test results are inadequate, particularly in the presence of relatively large amounts of water.

WO 02/08354 (8) describes antifreeze concentrates and coolant compositions comprising them for the protection of magnesium and magnesium alloys, containing from 0.05 to 10% by weight of carboxamides and/or sulfonamides. Examples based on monoethylene glycol with a water content of 30%, which gave very good corrosion test results, are described.

It is an object of the present invention to provide corresponding antifreeze formulations which no longer have the disadvantages of the prior art. The antifreezes to be prepared should in particular have good thermal conductivity, be nontoxic and ensure good corrosion prevention from magnesium and magnesium alloys, but also for aluminum and aluminum alloys.

We have found that this object is achieved by antifreeze concentrates based on alkylene glycols, glycerol and/or 1,3-propanediol, comprising a) from 0.05 to 10, preferably from 0.5 to 5, % by weight, based on the total amount of the concentrate, of one or more polyethylene glycols and/or polypropylene glycols and b) from 0.01 to 10, preferably from 0.05 to 10, % by weight, based on the total amount of the concentrate, of one or more carboxamides and/or sulfonamides.

Surprisingly, it has been found that effective coolant formulations for magnesium and magnesium alloys are obtained by adding small amounts of polyethylene glycols to the mixtures according to (8).

In a preferred embodiment, the component a) is selected from diethylene glycol, triethylene glycol, tetraethylene glycol, pentaethylene glycol, hexaethylene glycol, dipropylene glycol, tripropylene glycol, tetrapropylene glycol, pentapropylene glycol, hexapropylene glycol and mixtures thereof, preferably triethylene glycol, tetraethylene glycol, tripropylene glycol, tetrapropylene glycol and mixtures thereof, in particular tripropylene glycol.

In the context of the present invention, the term propylene glycol is understood as meaning 1,2-propanediol.

The component b) is preferably selected from amides of linear and branched aliphatic, cycloaliphatic, aromatic and heteroaromatic carboxylic acids and/or sulfonic acids, each of 2 to 16, preferably 3 to 12, carbon atoms.

The amides and sulfonamides of component b) can, if required, be alkyl-substituted on the nitrogen atom of the amido group, for example by a $C_1$-$C_4$-alkyl group. Aromatic or heteroaromatic skeletons of the molecule can of course also carry alkyl groups. One or more, preferably one or two, amido groups may be present in the molecule. The amides may carry additional functional groups, preferably $C_1$-$C_4$-alkoxy, amino, chlorine, fluorine, hydroxyl and/or acetyl, such functional groups being in particular substituents on aromatic or heteroaromatic rings present.

Typical examples of such carboxamides and sulfonamides are given below.

Aromatic Carboxamides:
Benzamide
2-Methylbenzamide
3-Methylbenzamide
4-Methylbenzamide
2,4-Dimethylbenzamide
4-tert-Butylbenzamide
3-Methoxybenzamide
4-Methoxybenzamide
2-Aminobenzamide (anthranilamide)
3-Aminobenzamide
4-Aminobenzamide
3-Amino-4-methylbenzamide
2-Chlorobenzamide
3-Chlorobenzamide
4-Chlorobenzamide
2-Fluorobenzamide
3-Fluorobenzamide
4-Fluorobenzamide
2,6-Difluorobenzamide
4-Hydroxybenzamide
Phthalamide
Terephthalamide Heteroaromatic Carboxamides:
Nicotinamide (pyridine-3-carboxamide)
Picolinamide (pyridine-2-carboxamide)

Aliphatic Carboxamides:
Succinamide
Adipamide
Propionamide
Hexanamide

Cycloaliphatic Carboxamides Having the Amido Group as Part of the Ring:
2-Pyrrolidone
N-Methyl-2-pyrrolidone
2-Piperidone
ε-Caprolactam Aliphatic Sulfonamides:
Methanesulfonamide
Hexane-1-sulfonamide Aromatic Sulfonamides:
Benzenesulfonamide
o-Toluenesulfonamide
m-Toluenesulfonamide
p-Toluenesulfonamide
4-tert-Butylbenzenesulfonamide
4-Fluorobenzenesulfonamide
4-Hydroxybenzenesulfonamide
2-Aminobenzenesulfonamide
3-Aminobenzenesulfonamide
4-Aminobenzenesulfonamide
4-Acetylbenzenesulfonamide In a further preferred embodiment, the novel antifreeze concentrates additionally contain one or more of the nonionic compounds stated below:

c) from 0 to 10, preferably from 0.05 to 5, % by weight, based on the total amount of the concentrate, of one or more aliphatic, cycloaliphatic or aromatic amines of 2 to 15 carbon atoms, which may additionally contain etheroxygen atoms or hydroxyl groups, and/or d) from 0 to 10, preferably from 0.05 to 5, % by weight, based on the total amount of the concentrate, of one or more mononuclear or dinuclear unsaturated or partly unsaturated heterocycles of 4 to 10 carbon atoms, which may be benzofused and may carry additional functional groups, and/or e) from 0 to 10, preferably from 0.05 to 5, % by weight, based on the total amount of the concentrate, of one or more tetra($C_1$-$C_8$-alkoxy)silanes (tetra-$C_1$-$C_8$-alkyl orthosilicates).

Examples of aliphatic, cycloaliphatic or aromatic amines c) of 2 to 15, preferably 4 to 8, carbon atoms, which may additionally contain etheroxygen atoms or hydroxyl groups, include ethylamine, propylamine, isopropylamine, n-butylamine, isobutylamine, sec-butylamine, tert-butylamine, n-pentylamine, n-hexylamine, n-heptylamine, n-octylamine, isononylamine, di-n-propylamine, diisopropylamine, di-n-butylamine, hexamethylenetetramine (urotropine), mono-, di- and triethanolamine, piperidine, morpholine, aniline and benzylamine. The organic groups of the aliphatic and cycloaliphatic amines of group c) are preferably saturated.

Examples of heterocycles d) include mononuclear five- or six-membered systems having 1, 2 or 3 nitrogen atoms or having one nitrogen atom and one sulfur atom, which may be benzofused. Dinuclear systems comprising five- and/or six-membered rings with, typically, 2, 3 or 4 nitrogen atoms may also be used. The heterocycles of group d) may additionally carry functional groups, preferably $C_1$-$C_4$-alkoxy, amino and/or mercapto. The heterocyclic skeleton can of course also carry alkyl groups.

Examples of heterocycles d) include benzotriazole, tolutriazole, hydrogenated tolutriazole, 1H-1,2,4-triazole, benzimidazole, benzothiazole, mercaptobenzothiazole, adenine, purine, 6-methoxypurine, indole, isoindole, isoindoline, pyridine, pyrimidine, 3,4-diaminopyridine, 2-aminopyrimidine and 2-mercaptopyrimidine.

Examples of tetra($C_1$-$C_8$-alkoxy)silanes e) include tetramethoxysilane, tetraethoxysilane, tetra-n-propoxysilane and tetra-n-butoxysilane.

The novel antifreeze concentrates may furthermore contain one or more of the compounds stated below:

f) from 0 to 10, preferably from 0.05 to 5, % by weight, based on the total amount of concentrate, of one or more aliphatic or aromatic monocarboxylic acids, each of 3 to 16 carbon atoms, in the form of the alkali metal, ammonium or substituted ammonium salts thereof and/or g) from 0 to 10, preferably from 0.05 to 5, % by weight, based on the total amount of the concentrate, of one or more aliphatic or aromatic dicarboxylic acids, each of 4 to 20 carbon atoms, in the form of the alkali metal, ammonium or substituted ammonium salts thereof and/or h) one or more alkali metal borates, alkali metal phosphates, alkali metal silicates, alkali metal nitrites, alkali metal or alkaline earth metal nitrates, molybdates or alkali metal or alkaline earth metal fluorides, each in amounts of from 0 to 1% by weight, based on the total amount of the concentrate, and/or i) from 0 to 1% by weight, based on the total amount of the concentrate, of one or more hard water stabilizers based on polyacrylic acid, polymaleic acid, acrylic acid/maleic acid copolymers, polyvinylpyrrolidone, polyvinylimidazole, vinylpyrrolidone/vinylimidazole copolymers and/or copolymers of unsaturated carboxylic acids and olefins.

The compounds of groups f), g) and h) are additional corrosion inhibitors.

Examples of linear, branched or cyclic aliphatic monocarboxylic acids of group f) include propionic acid, pentanoic acid, hexanoic acid, cyclohexylacetic acid, octanoic acid, 2-ethylhexanoic acid, nonanoic acid, isononanoic acid, decanoic acid, undecanoic acid and dodecanoic acid.

Examples of aromatic monocarboxylic acids of group f) include in particular benzoic acid and furthermore $C_1$- to $C_8$-alkylbenzoic acids, for example o-, m- and p-methylbenzoic acid or p-tert-butylbenzoic acid, $C_1$- to $C_4$-alkoxybenzoic acids, for example o-, m- and p-methoxybenzoic acid, hydroxyl-containing aromatic monocarboxylic acids, for example o-, m- or p-hydroxybenzoic acid, o-, m- and p-(hydroxymethyl)benzoic acid, and halobenzoic acids, for example o-, m- or p-fluorobenzoic acid.

Examples of dicarboxylic acids of group g) include malonic acid, succinic acid, glutaric acid, adipic acid, pimelic acid, suberic acid, azelaic acid, sebacic acid, undecanedioic acid, dodecanedioic acid, dicyclopentadienedicarboxylic acid, phthalic acid and terephthalic acid.

All carboxylic acids mentioned are present as alkali metal salts, especially as sodium or potassium salts, or as ammonium salts or substituted ammonium salts (amine salts), for example with ammonia, trialkylamines or trialkanolamines.

Examples of additional corrosion inhibitors stated under h) include sodium tetraborate (borax), disodium hydrogen phosphate, trisodium phosphate, sodium metasilicate, sodium nitrite, sodium nitrate, magnesium nitrate, sodium fluoride, potassium fluoride, magnesium fluoride and sodium molybdate.

When alkali metal silicates are present, the abovementioned inhibitors are expediently stabilized by conventional organosilicophosphonates or organosilicosulfonates in conventional amounts.

In addition to said inhibitor components, for example, soluble salts of magnesium with organic acids, e.g. magnesium benzenesulfonate, magnesium methanesulfonate, magnesium acetate or magnesium propionate, hydrocarbazoles or quaternized imidazoles, as described in DE-A 196 05 509, may also be used in conventional amounts as further inhibitors.

The pH of the novel antifreeze concentrates is usually from 4 to 11, preferably from 4 to 10, in particular from 4.5 to 8.5. The desired pH can, if required, also be established by adding alkali metal hydroxides, ammonia or amines to the formulation, solid sodium hydroxide or potassium hydroxide and aqueous sodium hydroxide or potassium hydroxide solution being particularly suitable for this purpose. Carboxylic acids to be used are expediently added directly as corresponding alkali metal salts in order automatically to be in the desired pH range; however, the carboxylic acids can also be added as free acids and then neutralized with alkali metal hydroxide, ammonia or amines and brought to the desired pH range.

The main component of the novel antifreeze concentrate is at least one alkylene glycol, glycerol, 1,3-propanediol or a mixture thereof. This component or these components is or are preferably present in an amount of $\geq 75$, in particular $\geq 85$, % by weight. The alkylene glycol is preferably ethylene glycol and/or propylene glycol.

In a preferred embodiment, this main component is based on ethylene glycol, propylene glycol or mixtures thereof. Ethylene glycol and/or propylene glycol are present in an amount of at least 95% by weight, and furthermore glycerol or 1,3-propanediol may be present. In particular, the main component is ethylene glycol, propylene glycol or a mixture thereof.

The novel antifreeze concentrates may also contain conventional small amounts of antifoams (as a rule in amounts of from 0.003 to 0.008% by weight), dyes and bitter substances for reasons of hygiene and of safety in the event of swallowing (e.g. of the denatonium benzoate type) as further conventional assistants.

The present invention also relates to ready-to-use aqueous coolant compositions having a low freezing point, in particular for radiator protection in the automotive sector, which contain from 70 to 30, preferably from 60 to 40, % by weight of water and from 30 to 70, in particular from 40 to 60, % by weight of the novel antifreeze concentrates. The ready-to-use coolant compositions are obtained by diluting the novel antifreeze concentrates with water.

The novel antifreeze concentrates are distinguished in particular by more effective corrosion inhibition in the case of magnesium and magnesium alloys compared with the compositions of the prior art.

Therefore, a further object of the present invention is the use of an aqueous coolant composition according to the invention for the prevention of corrosion of magnesium and magnesium alloys in internal combustion machines. The protection is achieved for those parts which enter into contact with the coolant composition via the cooling circulation.

The examples which follow illustrate the invention without restricting it.

EXAMPLES

The coolant composition example 1 was prepared from a novel antifreeze concentrate and a comparative example from a concentrate according to WO 02/08354, each composition having a water content of 50% and said composition being shown in table 1; the antifreeze concentrates for example can be easily obtained by dissolving the components in monoethylene glycol. The aqueous coolant compositions are obtainable therefrom by simple dilution with water.

The testing of these aqueous coolant compositions was carried out directly without further dilution in the static hot surface test (ASTM D 4340-98) using a magnesium test specimen of the alloy AZ91 HP or on a cast aluminum test specimen of the alloy GAlSi6Cu4. Instead of concentrated nitric acid, chromic acid, which is more suitable for this metal, was used for cleaning the magnesium test specimen after the test.

The results appear in table 2. They show that, in the case of magnesium, substantially better corrosion prevention is achieved with the novel coolant composition than with the comparative example according to WO 02/08354 as prior art.

At the same time, good corrosion prevention is also achieved in the case of aluminum. Here, the slight weight increase in the case of cast aluminum in example 1 according to the invention indicates the formation of a stable protective layer.

TABLE 1

Coolant compositions tested

| Components [% by weight] | Example 1 | Comparative example according to WO 02/08354 |
|---|---|---|
| Mixture of p-toluenesulfonamide, triethanolamine and 1H-1,2,4-triazole | 2.5 | 2.5 |
| Tripropylene glycol | 3 | — |
| Distilled water | 50 | 50 |
| Monoethylene glycol | Remainder | Remainder |

TABLE 2

Static hot corrosion test according to ASTM D 4340-98

| Corrosion rate [mg/cm$^2$/week] | Example 1 | Comparative example according to WO 02/08354 |
|---|---|---|
| Mg AZ91 HP | −3.43 | −13.40 |
| GAlSi6Cu4 | +0.25 | — |

The invention claimed is:

1. An antifreeze concentrate based on alkylene glycol, glycerol, 1,3-propanediol, or a combination thereof, said antifreeze concentrate comprising:
   a) from 0.05 to 10% by weight, based on a total amount of the concentrate, of tripropylene glycol;
   b) from 0.01 to 10% by weight, based on a total amount of the concentrate, of p-toluenesulfonamide;
   c) from 0.05 to 10% by weight, based on a total amount of the concentrate, of triethanolamine; and
   d) from 0.05 to 10% by weight, based on a total amount of the concentrate, of 1H-1,2,4-triazole.

2. The concentrate of claim 1, further comprising:
   e) from 0 to 10% by weight, based on the total amount of the concentrate, of at least one tetra-($C_1$-$C_8$-alkoxy)silane or tetra-$C_1$-$C_8$-alkyl orthosilicate.

3. The concentrate of claim 2, wherein said at least one tetra ($C_1$-$C_8$-alkoxy)silane is selected from the group consisting of tetramethoxysilane, tetraethoxysilane, tetra-n-propoxysilane and tetra-n-butoxysilane.

4. The concentrate of claim 1, further comprising at least one of f), g), h), or i):
   f) from 0 to 10% by weight, based on the total amount of concentrate, of at least one aliphatic or aromatic monocarboxylic acid comprising 3 to 16 carbon atoms, in the form of an alkali metal, ammonium or substituted ammonium salt thereof;
   g) from 0 to 10% by weight, based on the total amount of the concentrate, of at least one aliphatic or aromatic dicarboxylic acid comprising 4 to 20 carbon atoms, in the form of an alkali metal, ammonium or substituted ammonium salt thereof;
   h) at least one alkali metal borate, alkali metal phosphate, alkali metal silicate, alkali metal nitrite, alkali metal nitrate, alkaline earth metal nitrate, molybdate fluoride, alkali metal fluoride, or alkaline earth metal fluoride, each in an amount ranging from 0 to 1% by weight, based on the total amount of the concentrate; and
   i) from 0 to 1% by weight, based on a total amount of the concentrate, of at least one hard water stabilizer selected from the group consisting of a polyacrylic acid, a polymaleic acid, an acrylic acid/maleic acid copolymer, a polyvinylpyrrolidone, a polyvinylimidazole, a vinylpyrrolidone/vinylimidazole copolymer, and a copolymer of an unsaturated carboxylic acid and an olefin.

5. The concentrate of claim 1, further comprising soluble salts of magnesium with organic acids, hydrocarbazoles, quaternized imidazoles, or a combination thereof.

6. The concentrate of claim 1, wherein said alkylene glycol, said glycerol, said 1,3-propanediol or said mixture thereof is present in amounts of ≧75% by weight.

7. The concentrate of claim 6, wherein the alkylene glycol is an ethylene glycol, a propylene glycol, or a mixture of an ethylene glycol and a propylene glycol.

8. The concentrate of claim 1, whose pH is from 4 to 11.

9. An aqueous coolant composition comprising:
   water; and
   from 30 to 70% by weight of the concentrate of claim 1.

10. A method for preventing corrosion of magnesium and magnesium alloys in internal combustion engines comprising:
   obtaining an aqueous coolant composition of claim 9; and
   contacting the aqueous coolant composition with internal combustion engines.

11. An antifreeze concentrate comprising:
   i) 2.5 wt % of a mixture of p-toluenesulfonamide and 1H-1,2,4-triazole;
   ii) 3 wt % of tripropylene glycol;
   iii) 50 wt % distilled water;
wherein the i), ii), and iii) are dissolved in monoethylene glycol and the weight percentages are relative to the total weight of the concentrate.

* * * * *